(12) United States Patent
Takahashi (10) Patent No.: US 9,597,929 B2
(45) Date of Patent: Mar. 21, 2017

(54) TIRE (75) Inventor: Junichi Takahashi, Koganei (JP)

(73) Assignee: BRIDGESTONE CORPORATION, Tokyo (JP)

( * ) Notice: Subject to any disclaimer, the term of this patent is extended or adjusted under 35 U.S.C. 154(b) by 568 days.

(21) Appl. No.: 14/128,726

(22) PCT Filed: Jun. 19, 2012

(86) PCT No.: PCT/JP2012/065621
§ 371 (c)(1),
(2), (4) Date: Dec. 23, 2013

(87) PCT Pub. No.: WO2012/176766
PCT Pub. Date: Dec. 27, 2012

(65) Prior Publication Data
US 2014/0124110 A1 May 8, 2014

(30) Foreign Application Priority Data
Jun. 24, 2011 (JP) .................................. 2011-140437

(51) Int. Cl.
*B60C 11/13* (2006.01)
*B60C 11/11* (2006.01)
(Continued)

(52) U.S. Cl.
CPC ........... *B60C 11/11* (2013.01); *B60C 11/0306* (2013.04); *B60C 11/1236* (2013.04);
(Continued)

(58) Field of Classification Search
CPC ............ B60C 11/1376; B60C 11/1384; B60C 11/1392; B60C 11/1307; B60C 11/1323;
(Continued)

(56) References Cited

U.S. PATENT DOCUMENTS 5,957,180 A * 9/1999 Kuramochi ............. B60C 11/12
152/209.21
2005/0173035 A1* 8/2005 Heinen ................ B60C 11/0302
152/209.9
(Continued)

FOREIGN PATENT DOCUMENTS

CN 101842251 A 9/2010
JP 62-151101 U 9/1987
(Continued)

OTHER PUBLICATIONS

English machine translation of JP2001-121926, dated May 2001.*
(Continued)

*Primary Examiner* — Steven D Maki
*Assistant Examiner* — Robert Dye
(74) *Attorney, Agent, or Firm* — Sughrue Mion, PLLC (57) ABSTRACT

Stepped sections (110) whereby the height of a block (100) gradually decreases towards the outside of the tire peripheral direction from the center of the block (100) are formed in a peripheral direction end section (160) of the block (100). The stepped sections (110) have a first stepped surface (111a) and a second stepped surface (121a). A stepped surface (110a) extends from an outside end section (140) towards an inside end section (150).

7 Claims, 5 Drawing Sheets (51) Int. Cl.
*B60C 11/03* (2006.01)
*B60C 11/12* (2006.01)

(52) U.S. Cl.
CPC ... *B60C 11/1392* (2013.04); *B60C 2011/0346* (2013.04); *B60C 2011/0372* (2013.04); *B60C 2011/0381* (2013.04); *B60C 2011/1213* (2013.04); *B60C 2011/133* (2013.04)

(58) Field of Classification Search
CPC ....... B60C 2011/133; B60C 2011/1338; B60C 2011/0381; B60C 2011/0383
See application file for complete search history.

(56) References Cited

U.S. PATENT DOCUMENTS

| | | |
|---|---|---|
| 2009/0272473 A1 | 11/2009 | Kojima |
| 2009/0320981 A1 | 12/2009 | Matsumoto |
| 2010/0000643 A1* | 1/2010 | Minoli ................ B60C 11/1392 152/209.15 |

FOREIGN PATENT DOCUMENTS

| | | | |
|---|---|---|---|
| JP | 06-143935 | * | 5/1994 |
| JP | 9-300915 A | | 11/1997 |
| JP | 2001-121926 | * | 5/2001 |
| JP | 2006-151173 A | | 6/2006 |
| JP | 2010-30583 A | | 2/2010 |
| JP | 2010-132217 A | | 6/2010 |
| JP | 2011-46223 A | | 3/2011 |
| JP | 2011-51431 A | | 3/2011 |
| WO | 2007/058162 A1 | | 5/2007 |

OTHER PUBLICATIONS

English machine translation of JP06-143935, dated May 1994.*
English machine translation of JP2006-151173, dated Jun. 2006.*
Communication dated Jun. 30, 2015 from the Japanese Patent Office in counterpart application No. 2011-140437.
Communication dated Jun. 30, 2015 from the State Intellectual Property Office of the People's Republic of China in counterpart application No. 201280031281.6.
International Search Report PCT/JP2012/065621 dated Sep. 4, 2012.

* cited by examiner

TIRE

CROSS REFERENCE TO RELATED APPLICATIONS

This application is a National Stage of International Application No. PCT/JP2012/065621, filed on Jun. 19, 2012, which claims priority from Japanese Patent Application No. 2011-140437, filed on Jun. 24, 2011, the contents of all of which are incorporated herein by reference in their entirety.

TECHNICAL FIELD

The present invention relates to a tire including a block partitioned by a groove portion that includes a circumferential groove positioned at the outer side in a tread width direction from a tire equator line and extending in a tire circumferential direction and a lug groove extending in the tread width direction, in a tread planar view.

BACKGROUND ART

Conventionally, as a tire used for a snow-covered road surface, there has been known a tire including a block partitioned by a groove portion that includes a circumferential groove positioned at the outer side in a tread width direction from a tire equator line and extending in a tire circumferential direction and a lug groove extending in the tread width direction (see Patent Literature 1, for example). For example, in the tire of the Patent Literature 1, two block arrays in which a plurality of blocks are arranged in the tire circumferential direction are formed.

As described above, the block partitioned by the groove portion includes an edge portion biting into a snow surface to rub against the snow, and thus, the aforementioned tire has a snow traction performance. Furthermore, snow having entered the groove portion is trodden down by loads of the tire and a vehicle to form snow columns. The aforementioned tire is imparted with a snow traction performance by a snow shearing force effect obtained by kicking out the snow columns.

CITATION LIST

Patent Literature

[Patent Literature 1] Japanese Patent Application Publication No. 2010-132217

SUMMARY OF INVENTION

In the aforementioned tire, two block arrays in which the plurality of blocks are arranged in the tire circumferential direction are formed, and thus, a tread width direction outer end of the block is distanced from the tire equator line more than a tread width direction inner end of the block and the tread width direction outer end of the block is adjacent to the circumferential groove. In such a tire, there has been a tendency that grounding pressures at the tread width direction inner end and tread width direction outer end of each block differ from each other. Specifically, the tread width direction outer end has a lower grounding pressure than that of the tread width direction inner end. For this reason, an edge pressure at the tread width direction outer end becomes low, and as a result, it is not possible to obtain sufficient edge effects of the block as a whole. Therefore, there is a room for improvement in the snow traction performance.

Furthermore, the amount of snow having entered the groove portion is reduced if the block is worn down by use, and as a result, the snow shearing force effect is reduced. Thus, there is a problem that the snow traction performance is deteriorated in a tire with worn blocks.

Therefore, the present invention has been achieved in view of the above situations, and an object thereof is to provide a tire configured to include a block partitioned by a groove portion that includes a circumferential groove extending in a tire circumferential direction and a lug groove extending in a tread width direction, and configured so that tread width direction outer end of the block is adjacent to the circumferential groove and the tread width direction outer end is distanced from a tire equator line more than a tread width direction inner end of the block, with which it is possible to improve snow traction performance and suppress the deterioration of the snow traction performance due to worn blocks.

The present invention has following features to solve the above problem. The feature of the present invention is summarized as a tire comprising: a block (block 100) partitioned by a groove portion that includes a circumferential groove (circumferential groove 20) positioned at an outer side in a tread width direction from a tire equator line (tire equator line CL) and extending in a tire circumferential direction and a lug groove (lug groove 50) extending in the tread width direction, in a tread planar view, wherein a tread width direction outer end (outer end 140) of the block is adjacent to the circumferential groove, the tread width direction outer end is distanced from the tire equator line more than a tread width direction inner end (inner end 150) of the block, the block includes a step portion (step portion 110) formed at a tire circumferential end (circumferential end 160), in which an height of the block gradually reduces as it goes towards an outer side in the tire circumferential direction from the center of the block, the step portion includes a step surface (step surface 110a) that is a surface facing an outer side in a tire radial direction, and that includes at least a first step surface (first step surface 111a) facing the outer side in the tire radial direction and lower by one step from a tread surface and a second step surface (second step surface 121a) facing the outer side in the tire radial direction and lower by two steps from the tread surface, and the step surface extends from the tread width direction outer end towards the tread width direction inner end.

When a first direction is defined as a direction extending from the tread width direction outer end towards the tread width direction inner end in the step surface, a first direction length of the second step surface may be longer than a first direction length of the first step surface.

When a first direction length of a side surface of the block is defined as a length L, the first direction length of the first step surface is defined as a length L1, and the first direction length of the second step surface is defined as a length L2, at the tire circumferential end including the step portion, the length L1 and the length L2 may satisfy $0.1L \leq L1 \leq 0.3L$, and $2L1 \leq L2$.

When a tire radial direction length from the tread surface to the first step surface is defined as a length D1 and a tire radial direction length from the first step surface to the second step surface is defined as a length D2, the length D1 and the length D2 may satisfy $D2 < D1$.

When the height of the block is defined as a height H, the length D1 and the length D2 may satisfy $0.1H \leq D2 < D1 \leq 0.3H$.

When a first direction is defined as a direction extending from the tread width direction outer end towards the tread width direction inner end, and a second direction is defined as a direction perpendicular to the first direction and the tire radial direction, in the step surface, and when an average length of the block in the second direction is defined as a width W, a length of the first step surface in the second direction is defined as a width W1, and a length of the second step surface in the second direction is defined as a width W2, the width W1 and the width W2 may satisfy $0.02W \leq W1 \leq 0.05W$ and $0.02W \leq W2 \leq 0.05W$.

The groove portion may include an intersectional groove (intersectional groove 80) extending to intersect with the lug groove, the intersectional groove may communicate to the block, and an extension direction end (extension direction end 88) of the intersectional groove may be positioned in the block in the tread planar view.

The block may include one tire circumferential end (circumferential end 160) and the other tire circumferential end (circumferential end 170), the block may include the step portion formed only at the one tire circumferential end, and an opening (opening) may be formed by the intersectional groove at the other tire circumferential end.

The lug groove may include an inner lug groove portion (inner lug groove portion 55) positioned at an inner side in the tread width direction from the intersectional groove, and the inner lug groove portion may be adjacent to the block while interposing the intersectional groove, in a direction away from the tire equator line among the extension directions of the inner lug groove portion.

According to the present invention, it is possible to improve snow traction performance and suppress the deterioration of the snow traction performance due to worn blocks, in a tire configured to include a block partitioned by a groove portion that includes a circumferential groove extending in a tire circumferential direction and a lug groove extending in a tread width direction, and configured so that a tread width direction outer end of the block is adjacent to the circumferential groove and the tread width direction outer end is distanced from a tire equator line more than a tread width direction inner end of the block.

DESCRIPTION OF EMBODIMENTS

An example of a tire according to the present invention will be described with reference to the drawings. Specifically, (1) Schematic Configuration of Tread Pattern, (2) Schematic Configuration of Block 100, (3) Operation and Effect, (4) Comparative Evaluations, and (5) Other Embodiments will be described.

In the following description of the drawings, the same or similar reference numerals are used to designate the same or similar parts. It will be appreciated that the drawings are schematically shown and the ratio and the like of each dimension are different from the real ones. Therefore, the specific dimensions and the like must be determined in view of the below explanation. It is needless to say that relations and ratios among the respective dimensions may differ among the diagrams.

(1) Schematic Configuration of Tread Pattern

Figure 1:
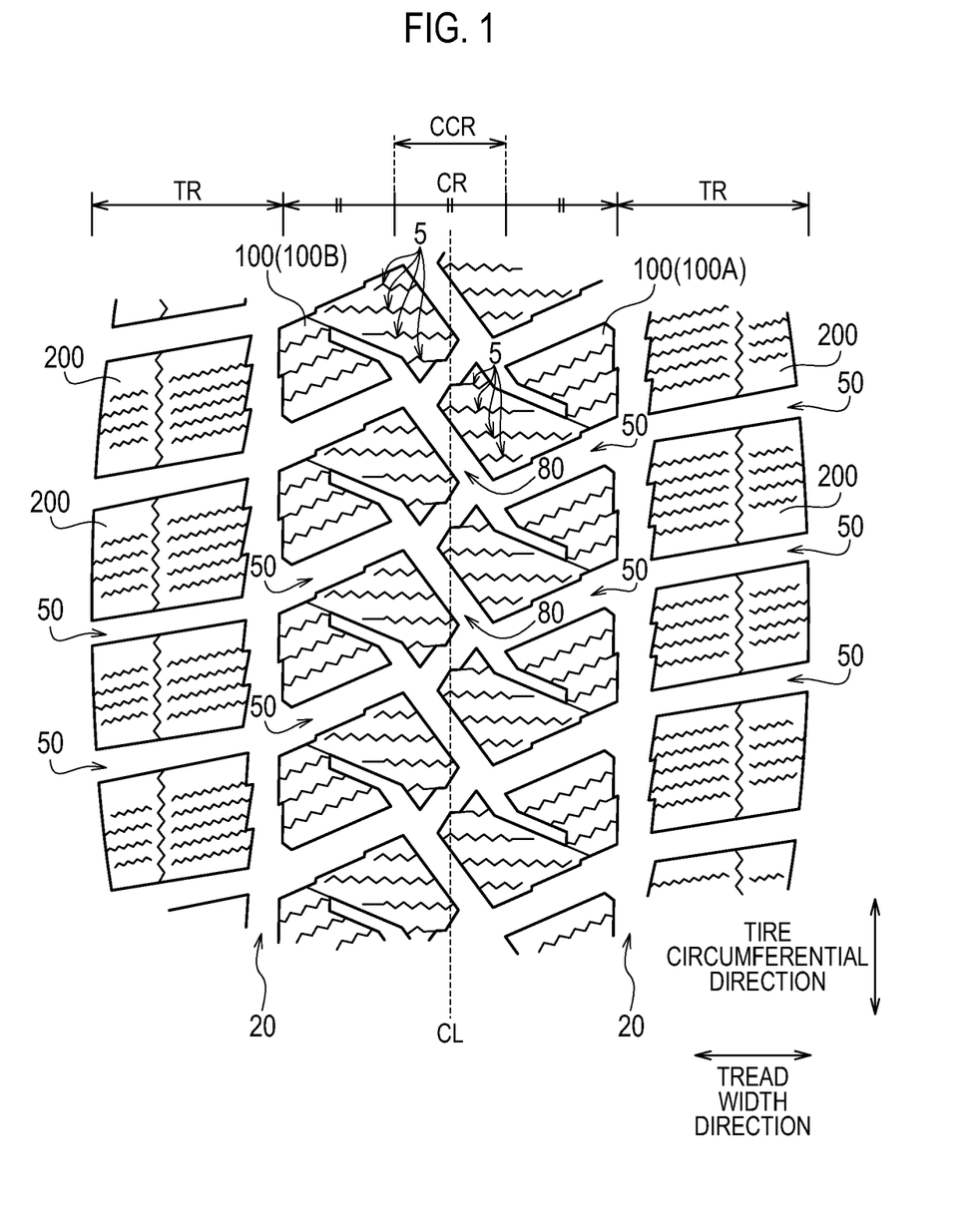
FIG. 1 is a schematic view showing a tread pattern of a tire according to the present embodiment.
Figure 2:
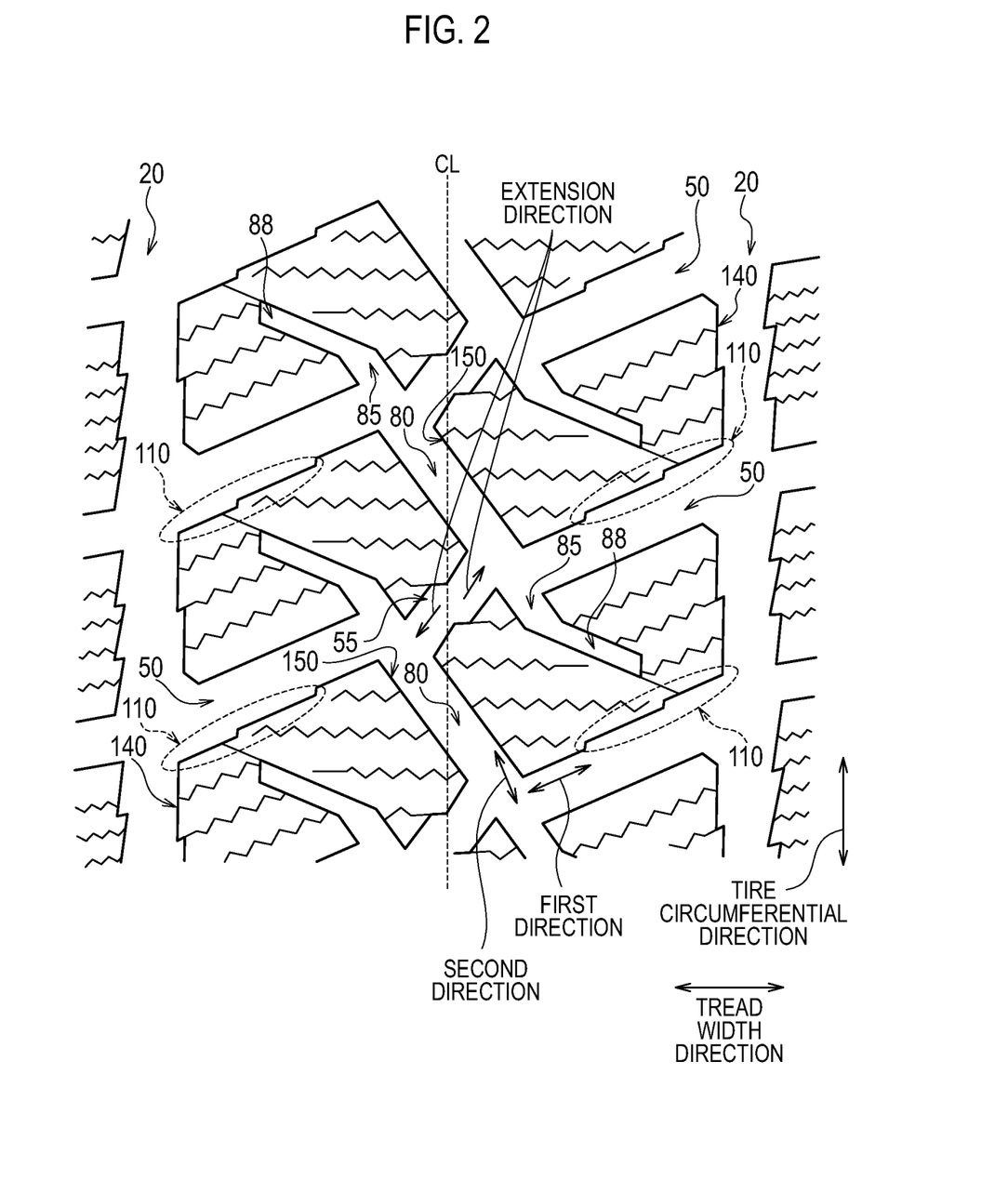
FIG. 2 is an enlarged schematic view showing a part of the tread pattern of the tire according to the present embodiment.

A schematic configuration of a tread pattern in a tire according to the present embodiment will be described with reference to FIG. 1 and FIG. 2. FIG. 1 is a schematic view showing the tread pattern of the tire according to the present embodiment. FIG. 2 is an enlarged schematic view showing a part of the tread pattern of the tire according to the present embodiment.

As shown in FIG. 1, the tire according to the present embodiment includes: a groove portion including a circumferential groove 20, a lug groove 50, and an intersectional groove 80; a block 100; and an end block 200. Furthermore, the tire according to the present embodiment includes a central region CR positioned in the center in a tread width direction, and end regions TR positioned at the both outer sides in the tread width direction of the central region CR.

The circumferential groove 20 extends in a tire circumferential direction in a tread planar view. The circumferential groove 20 is positioned at the outer side in the tread width direction from a tire equator line CL. In the present embodiment, the circumferential groove 20 is positioned at the inner side in the tread width direction of each of the end regions TR. That is, the tread width direction inner end of the circumferential groove 20 becomes a boundary between the central region CR and end region TR. The circumferential grooves 20 are formed at the both end regions TR. Therefore, the tire according to the present embodiment includes two circumferential grooves 20.

The block 100 is positioned at the inner side in the tread width direction of the circumferential groove 20. That is, the circumferential groove 20 is adjacent to the block 100 in the tread width direction. The end block 200 is positioned at the outer side in the tread width direction of the circumferential groove 20.

The lug groove 50 extends in the tread width direction in the tread planar view. In the present embodiment, the lug groove 50 extends to be inclined relative to the tread width direction. The lug groove 50 extends from one end towards the other end of a tread portion in the tread width direction. That is, the lug groove 50 extends from one end region TR towards the other end region TR through the central region CR. The lug groove 50 extends in a zigzag line in the central region CR. The lug groove 50 extends in a straight line in the end regions TR. The lug groove 50 is positioned at tire circumferential direction sides of the block 100 and end block 200.

The lug groove 50 intersects with the circumferential groove 20 in the tread planar view. The lug groove 50 extends to be inclined relative to the tread width direction, and thus, a position at which the lug groove 50 intersects with one circumferential groove 20 differs in the tire circumferential direction from a position at which the lug groove 50 intersects with the other circumferential groove 20. In addition, an intersectional angle at this time is a smaller angle formed between the circumferential groove 20 and the lug groove 50 in the tread planar view.

As shown in FIG. 2, the lug groove 50 includes an inner lug groove portion 55 positioned at the inner side in the tread width direction from the intersectional groove 80. In the present embodiment, the inner lug groove portion 55 is positioned on the tire equator line CL. FIG. 2 shows extension directions in which the inner lug groove portion 55 extends. In one of the extension directions, of the inner lug groove portion 55 that is distanced from the tire equator line CL the inner lug groove portion 55 is adjacent to the block 100 while interposing the intersectional groove 80. That is, a tread width direction outer end of the inner lug groove portion 55, the intersectional grooves 80, and the block 100 are positioned in this order toward the extension direction. In addition, in the present embodiment, the inner lug groove portion 55 is adjacent to the block 100 while interposing the intersectional groove 80 in either of one extension direction or the other extension direction.

The intersectional groove 80 extends to intersect with the lug groove 50. In addition, an intersectional angle at this time is a smaller angle formed between the lug groove 50 and intersectional groove 80 in the tread planar view.

The intersectional groove 80 includes an extension direction end 88 that is an end in an extension direction in which the intersectional groove 80 extends. The intersectional groove 80 communicates to the block 100. Thus, the extension direction end 88 is positioned in the block 100 in the tread planar view. In the present embodiment, either one or the other extension direction end 88 is positioned in the block 100. The intersectional groove 80 extends to be bent in the block 100. In the present embodiment, the intersectional groove 80 is positioned only in the central region CR.

In the present embodiment, the inner lug groove portion 55 and intersectional groove 80 configure a zigzag groove portion extending in the tire circumferential direction in a zigzag line.

The block 100 is partitioned by the groove portion that includes the circumferential groove 20 and the lug groove 50 in the tread planar view. Specifically, the block 100 is partitioned by the circumferential groove 20, the lug groove 50, and the intersectional groove 80. The blocks 100 include a plurality of blocks 100A positioned at one outer side in the tread width direction (the right side in FIG. 1) and a plurality of blocks 100B positioned at the other outer side in the tread width direction (the left side in FIG. 1). The plurality of blocks 100A are mutually adjacent to one another in the tire circumferential direction while interposing the lug grooves 50. The plurality of blocks 100B are mutually adjacent to one another in the tire circumferential direction while interposing the lug grooves 50. That is, the tire according to the present embodiment includes a block array including the blocks 100A and extending in the tire circumferential direction, and a block array including the blocks 100B and extending in the tire circumferential direction. A tread pattern according to the present embodiment has a shape of point symmetry about a point positioned on the tire equator line CL, and thus, each block 100A has the same shape as that of each block 100B.

Figure 3:
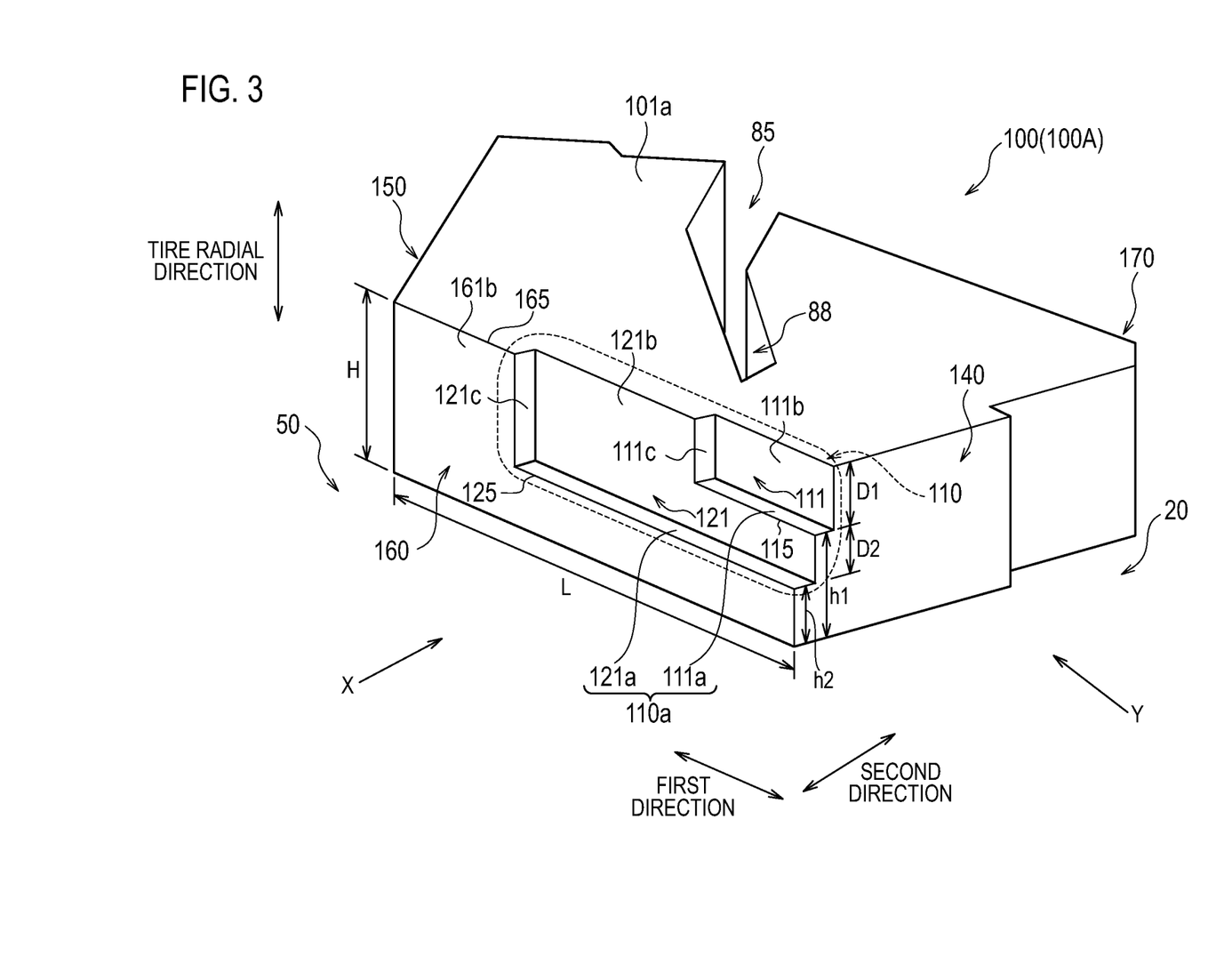
FIG. 3 is a schematic view of a block 100 according to the present embodiment.

The block 100 includes an outer end 140 that is an end at the outer side in the tread width direction and an inner end 150 that is an end at the inner side in the tread width direction (see FIG. 3). Furthermore, the block 100 includes a circumferential end 160 that is one end in the tire circumferential direction and a circumferential end 170 that is the other end in the tire circumferential direction (see FIG. 3). Also, the block 100 includes a step portion 110 formed at the circumferential end 160. The step portion 110 will be described later. At the circumferential end 170, an opening 85 is formed by the intersectional groove 80. In the present embodiment, the opening 85 is formed only at the circumferential end 170.

The outer end 140 is adjacent to the circumferential groove 20. The inner end 150 is adjacent to the intersectional groove 80. The circumferential end 160 and circumferential end 170 are adjacent to the lug groove 50. The outer end 140 is distanced from the tire equator line CL more than the inner end 150.

In the block 100, a siping 5 is formed. In the present embodiment, the siping 5 is formed in a zigzag line. It is preferable that the siping 5 formed in a region CCR positioned on the tire equator line CL, among three regions into which the central region CR is divided equally in the tread width direction, extends in the tire width direction. In a tire (for example, a tire for a light truck) in which an increase or decrease of an applied load bounces depending on the use condition, grounding contact area of the end region TR with low applied load is reduced as compared to that of the end region TR with high applied load. On the other hand, a grounding contact area of the central region CR, particularly the region CCR, is not susceptible to the increase or decrease of the applied load. Thus, by forming the siping 5 in the region CCR, it is possible to obtain an edge effect that is not susceptible to the increase or decrease of the applied load. It is preferable that an angle formed between the siping 5 formed in the region CCR and the tread width direction is smaller. Accordingly, it is possible to obtain snow traction performance that is not susceptible to the increase or decrease of the applied load.

It is noted that the siping has a groove width capable of closing when the block comes into contact with the ground. Specifically, the siping has a groove width of 1.5 mm or less. However, in the tire such as a TBR tire used for a large bus or a truck, a groove width of the siping may be 1.5 mm or more.

The block 200 is positioned at the end regions TR. The plurality of blocks 200 are mutually adjacent to one another in the tire circumferential direction while interposing the lug grooves 50.

(2) Schematic Configuration of Block 100

Figure 4:
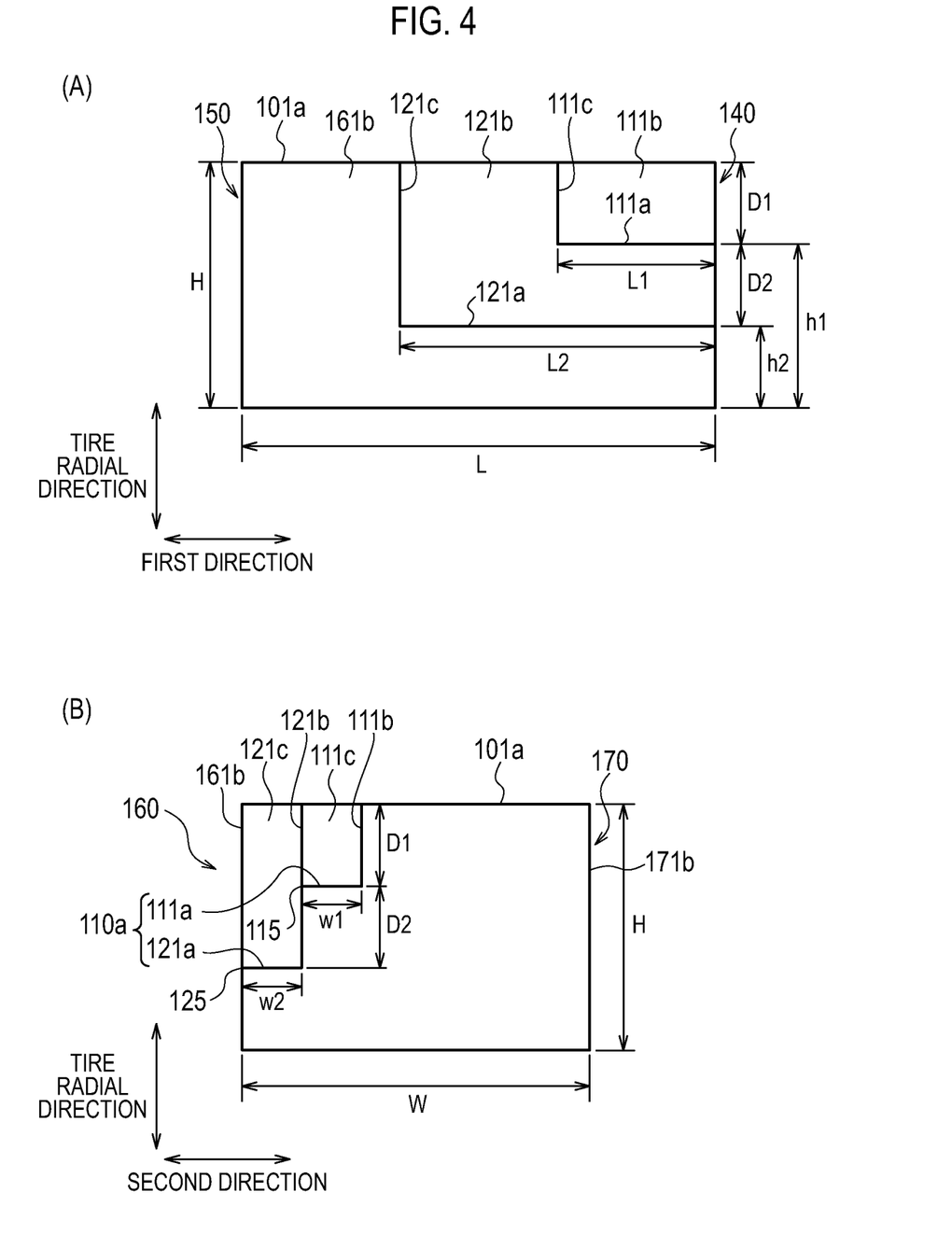
FIG. 4(a) is a schematic diagram in which the block 100 according to the present embodiment is seen from an X direction in FIG. 3.
FIG. 4(b) is a schematic diagram in which the block 100 according to the present embodiment is seen from a Y direction in FIG. 3.

A schematic configuration of the block 100 according to the present embodiment will be described with reference to FIG. 1 to FIG. 4. FIG. 3 is a schematic view of the block 100 according to the present embodiment. FIG. 4(a) is a schematic diagram in which the block 100 according to the present embodiment is seen from an X direction in FIG. 3. FIG. 4(b) is a schematic diagram in which the block 100 according to the present embodiment is seen from a Y direction in FIG. 3. In addition, FIG. 4(a) and FIG. 4(b) are schematic diagrams explaining the configuration of the block 100, and the shape of the block 100 may be different in some parts from those of the other diagrams. In FIG. 3, FIG. 4(a), and FIG. 4(b), the siping is not shown.

Also, the block 100 includes the step portion 110 formed at the circumferential end 160. In the present embodiment, the block 100 includes the step portion 110 formed only at the circumferential end 160. The height of the block 100 gradually reduces in the step portion 110, as it goes towards the outer side in the tire circumferential direction from the center of the block 100.

The step portion 110 is configured by a first step portion 111 and a second step portion 121. The first step portion 111 is configured by a first step surface 111a, a side surface 111b, and a side surface 111c. The second step portion 121 is configured by a second step surface 121a, a side surface 121b, and a side surface 121c.

The step portion 110 includes a step surface 110a that is a surface facing the outer side in the tire radial direction. The step surface 110a includes at least the first step surface 111a that is a surface facing the outer side in the tire radial direction and lower by one step from a tread surface 101a, and the second step surface 121a that is a surface facing the outer side in the tire radial direction and lower by two steps from the tread surface 101a. Therefore, the second step surface 121a is lower by one step from the first step surface 111a. In the present embodiment, the step surface 110a is configured by the first step surface 111a and second step surface 121a.

The step surface 110a extends from the outer end 140 towards the inner end 150. In the step surface 110a, an extension direction of the step surface 110a that is a direction extending from the outer end 140 towards the inner end 150 is regarded as a first direction. In addition, the first direction coincides with an extension direction of the lug groove 50 adjacent to the circumferential end 160 of the block 100. The step surface 110a extends in a straight line. The step surface 110a extends from the outer end 140, and thus, the tread width direction outer end of the step surface 110a is positioned at the outer end 140. Therefore, the tread width direction outer ends of the first step surface 111a and second step surface 121a are at the same position in the first direction. That is, in the outer end 140 of the block 100, an edge portion at a tire circumferential end where the step portion 110 is formed has a stair-like shape.

The side surface 111b and side surface 121b are surfaces facing second direction sides of the first step portion 111 and second step portion 121, respectively. Here, the second direction is a direction perpendicular to the first direction and a tire radial direction. The side surface 111b communicates to the tread surface 101a at the outer side in the tire radial direction, and to the first step surface 111a at the inner side in the tire radial direction. The side surface 121b at the outer side in the tread width direction communicates to the first step surface 111a at the outer side in the tire radial direction, and to the second step surface 121a at the inner side in the tire radial direction. The side surface 121b at the inner side in the tread width direction communicates to the tread surface 101a at the outer side in the tire radial direction, and to the second step surface 121a at the inner side in the tire radial direction. That is, the side surface 121b has an L shape as shown in FIG. 4(a). A side surface 161b of the block 100 at the circumferential end 160 communicates to the tread surface 101a and second step surface 121a at the outer side in the tire radial direction, and to a groove bottom of the lug grooves 50 at the inner side in the tire radial direction. The side surface 161b at the outer side in the tire radial direction communicates to the tread surface 101a, and the side surface 161b at the inner side in the tire radial direction communicates to the second step surface 121a. That is, the side surface 161b has an L shape as shown in FIG. 4(a).

The side surface 111c and side surface 121c are surfaces facing first direction sides of the first step surface 111a and second step surface 121a, respectively. The side surface 111c communicates to the tread surface 101a at the outer side in the tire radial direction, and to the first step surface 111a at the inner side in the tire radial direction. The side surface 121c communicates to the tread surface 101a at the outer side in the tire radial direction, and to the second step surface 121a at the inner side in the tire radial direction.

The height of the block 100 gradually reduces in the step portion 110, as it goes towards the outer side in the tire circumferential direction from the center of the block 100. Thus, the step portion 110 has a stair-like shape including a plurality of step differences. In the present embodiment, the block 100 has a stair-like shape including a plurality of step differences in the first direction. Specifically, the step portion 110 includes the side surface 111c lower by one step from a side surface of the outer end 140, and the side surface 121c lower by two steps from the side surface of the outer end 140. Accordingly, in the tread surface 101a, a block edge portion 165 that is an edge portion at the circumferential end 160 of the block 100 has a zigzag shape.

The step portion 110 is formed in the block 100, and thus, the circumferential end 160 of the block 100 is cut out at the outer side in the tread width direction. Therefore, the block 100 includes, at the circumferential end 160, a plurality of recesses recessed in the tire radial direction. The depth recessed in the tire radial direction becomes deeper in the plurality of recesses, as it goes towards the outer side in the second direction from the center of the block 100.

As shown in FIG. 4(a), a first direction length of the side surface 161b of the block 100 is regarded as a length L at the circumferential end 160. The length L is a length of the block 100, along the first direction, from the outer end 140 to the inner end 150, in the side surface 161b. The first direction length of the first step surface 111a is regarded as a length L1. The first direction length of the second step surface 121a is regarded as a length L2. It is preferable that the length L2 is longer than the length L1. Furthermore, it is preferable that the length L1 and length L2 satisfy $0.1L \leq L1 \leq 0.3L$ and $2L1 \leq L2$.

A height, along the tire radial direction, from the tread surface 101a to the groove bottom of the groove portion (namely, a tire radial direction length), that is the height of the block, is regarded as a height H. A height, along the tire radial direction, from the first step surface 111a to the groove bottom of the groove portion is regarded as a height h1. A height, along the tire radial direction, from the second step surface 121a to the groove bottom of the groove portion is regarded as a height h2. The height of the block 100 gradually reduces in the step portion 110 as it goes towards the outer side in the tire circumferential direction from the center of the block 100, and thus, the height H, height h1, and height h2 satisfy $h2 < h1 < H$.

A tire radial direction length from the tread surface 101a to the first step surface 111a is regarded as a length D1. A tire radial direction length from the first step surface 111a to the second step surface 121a is regarded as a length D2. It is preferable that the length D1 and length D2 satisfy $D2 < D1$. Furthermore, it is preferable that the D1 and D2 satisfy $0.1H \leq D2 < D1 \leq 0.3H$. Here, the 0.1H denotes 0.1 times the height H and the 0.3H denotes 0.3 times the height H.

The length D1 and length D2 may satisfy $D1 = D2$. Furthermore, the length D1 and length D2 may satisfy $D1 < D2$. Moreover, the D1 and D2 may satisfy $0.1H \leq D1 < D2 \leq 0.3H$. By satisfying $0.1H \leq D1$, in the early stage of using the tire, it is possible to prevent a first edge portion 115 that is an edge portion formed between the first step surface 111a and side surface 121*b* from coming in contact with a road surface. If the first edge portion 115 comes into contact with the road surface, an edge pressure at the block edge portion 165 formed between the tread surface 101*a* and side surface 111*b* is reduced. Edge effects are reduced if the edge pressure is reduced, and as a result, the snow traction performance is deteriorated. By preventing the first edge portion 115 from coming in contact with the road surface, edge effects in the early stage of using the tire can be secured. When a step difference that is a difference of the step surface 110*a* in the tire radial direction is smaller, a side bulging (so-called crushing) in which a side surface bulges is less likely to occur. The edge pressure is reduced if the side bulging occurs, and as a result, edge effects are reduced. The side bulging becomes less likely to occur in the side surface 121*b* by satisfying D2≤0.3H, and thus, it is possible to obtain sufficient edge effects of the first edge portion 115 when the block 100 is worn down.

The length D1 is 15 to 25% of the height H and it is preferable that the sum of the length D1 and length D2 is 40 to 50% of the height H.

An average length of the block 100 in the second direction is regarded as a width W. The width W is an average length, along the second direction, from the side surface 161*b* at the circumferential end 160 to a side surface 171*b* at the circumferential end 170. The portion formed by the intersectional groove 80 is not included in the average length. As shown in FIG. 4(*b*), a length of the first step surface 111*a* in the second direction is regarded as a width W1. The width W1 is a length of the side surface 111*c* along the second direction. A length of the second step surface 121*a* in the second direction is regarded as a width W2. The width W2 is a length of the side surface 121*c* along the second direction. It is preferable that the width W1 and width W2 satisfy 0.02W≤W1≤0.05W and 0.02W≤W2≤0.05W. That is, it is preferable that the width W1 and width W2 are 2% or more and 5% or less the width W.

(3) Operation and Effect

In the tire according to the present embodiment, the block 100 includes the step portion 110 formed at the circumferential end 160, in which the height of the block 100 gradually reduces as it goes towards the outer side in the tire circumferential direction from the center of the block 100, the step portion 110 includes the first step surface 111*a* and second step surface 121*a*, and the step surface 110*a* extends from the outer end 140 towards the inner end 150.

The step portion 110 that includes the step surface 110*a* extending from the outer end 140 is formed in the block 100, and thus, a length, along the tire circumferential direction, of the outer end 140 becomes shorter as compared to the case in which the step portion 110 is not formed. Therefore, a grounding pressure on the outer end 140 can be increased, and thus, an edge pressure on the outer end 140 is increased. Accordingly, it is possible to obtain sufficient edge effects of the block 100 as a whole. As a result, the snow traction performance can be improved. In addition, a difference of grounding pressures between the outer end 140 and inner end 150 is reduced, and thus, it is possible to keep balance of the grounding pressure of the block 100 and prevent the block 100 from being unevenly worn.

The step portion 110 includes the first step surface 111*a* and second step surface 121*a*, and therefore, the block 100 includes a plurality of edge portions (the first edge portion 115 and the second edge portion 125) in the tire radial direction. Thus, edge effects by the plurality of edge portions can be obtained even if the block 100 is worn out by use, and therefore, it is possible to suppress the deterioration of the snow traction performance due to the worn block.

In the tire according to the present embodiment, the first direction length of the second step surface 121*a* is longer than the first direction length of the first step surface 111*a*. Therefore, it is possible to obtain more enhanced edge effects when the block 100 is worn out by use, as compared to the case in which the plurality of edge portions has the same first direction length. As a result, it is possible to more suppress the deterioration of the snow traction performance due to wear.

Furthermore, the first direction length of the first step surface 111*a* is shorter than the first direction length of the second step surface 121*a*, and thus, it is possible to ensure a larger area of the tread surface 101*a* of the block 100. As a result, a surface friction effect between the tread surface 101*a* and the snow surface can be secured, and thus, the snow traction performance can be improved.

In the tire according to the present embodiment, it is preferable that the length L1 and length L2 satisfy 0.1L≤L1≤0.3L, and 2L1≤L2. By satisfying 0.1L≤L1 and 2L1≤L2, it is possible to obtain sufficient edge effects by the first edge portion 115 and second edge portion 125.

In the tire according to the present embodiment, it is preferable that the length D1 and length D2 satisfy D2<D1. The first edge portion 115 is distanced from the tread surface 101*a*, and thus, it is possible to prevent the first edge portion 115 from coming in contact with the road surface. Accordingly, edge effects in the early stage of using the tire can be secured, and thus, the snow traction performance is improved. When a step difference that is a difference of the step surface 110*a* in the tire radial direction is smaller, a side bulging (so-called crushing) in which a side surface bulges is less likely to occur. The edge pressure is reduced if the side bulging occurs, and as a result, edge effects are reduced. The side bulging becomes less likely to occur in the side surface 121*b* by satisfying D2<D1 as compared to the side surface 111*b*, and thus, it is possible to obtain sufficient edge effects of the first edge portion 115 when the block 100 is worn down. As a result, it is possible to more suppress the deterioration of the snow traction performance due to wear.

Furthermore, in the tire according to the present embodiment, it is preferable that the length D1 and length D2 satisfy 0.1H≤D2<D1≤0.3H. When the block 100 is worn down, an edge pressure at the first edge portion 115 is reduced if the second edge portion 125 comes into contact with the road surface, when the first edge portion 115 becomes an edge portion at the outermost side in the tire radial direction. Accordingly, edge effects obtained by the first edge portion 115 are reduced, and as a result, the snow traction performance is deteriorated. It is possible to prevent the second edge portion 125 from coming in contact with the road surface by satisfying 0.1H≤D2, and thus, edge effects of the first edge portion 115 at the time when the block 100 is worn down can be secured. As a result, it is possible to more suppress the deterioration of the snow traction performance due to wear. Furthermore, the side bulging becomes less likely to occur in the side surface 111*b* by satisfying D1≤0.3H, and thus, it is possible to prevent edge effects of the block edge portion 165 from being reduced.

In the tire according to the present embodiment, it is preferable that the width W1 and width W2 satisfy 0.02W≤W1≤0.05W and 0.02W≤W2≤0.05W. By satisfying that the width W1 and width W2 are equal to or more than 2% of the width W, it is possible to obtain sufficient edge effects by the first edge portion 115 and the second edge portion 125.

In the tire according to the present embodiment, the groove portion includes the intersectional groove 80, the intersectional groove 80 communicates to the block 100, and the extension direction end 88 of the intersectional groove 80 is positioned in the block 100 in the tread planar view. When the intersectional groove 80 passes through the block 100, the block 100 is divided into a plurality of small blocks 100. Each of the small blocks 100 has weak block stiffness, and thus, the block 100 is easy to fall down when the tire rotates. If the block 100 falls down, a grounding property of the block 100 is deteriorated, and as a result, it is not possible to obtain sufficient edge effects. In the present embodiment, the extension direction end 88 is positioned in the block 100, and therefore, the intersectional groove 80 does not pass through the block 100. Therefore, the block stiffness of the block 100 can be secured, and thus, it is possible to obtain sufficient edge effects. Furthermore, the extension direction end 88 is positioned in the block 100, and thus, a groove area ratio (a negative ratio) in the tread surface increases. A snow shearing force is more likely to be obtained as the groove area ratio is larger, and thus, the snow traction performance is increased.

In the tire according to the present embodiment, the block 100 includes the circumferential end 160 and circumferential end 170, and also includes the step portion 110 formed only at the circumferential end 160 and the opening 85 formed at the circumferential end 170 by the intersectional groove 80. The circumferential end 170 with the opening 85 formed thereat has weaker block stiffness as compared to the circumferential end 160 without the opening 85 formed thereat. The block stiffness of the circumferential end 170 is further reduced if the step portion 110 is formed at the circumferential end 170. Therefore, it is not possible to obtain sufficient edge effects due to the fall even if the step portion 110 is formed. By preventing the block stiffness of the circumferential end 170 from being reduced by forming the step portion 110 only at the circumferential end 160, edge effects by the block edge portion 165 are secured. Furthermore, it is possible to prevent the circumferential end 170 from being unevenly worn due to the fall.

Figure 5:
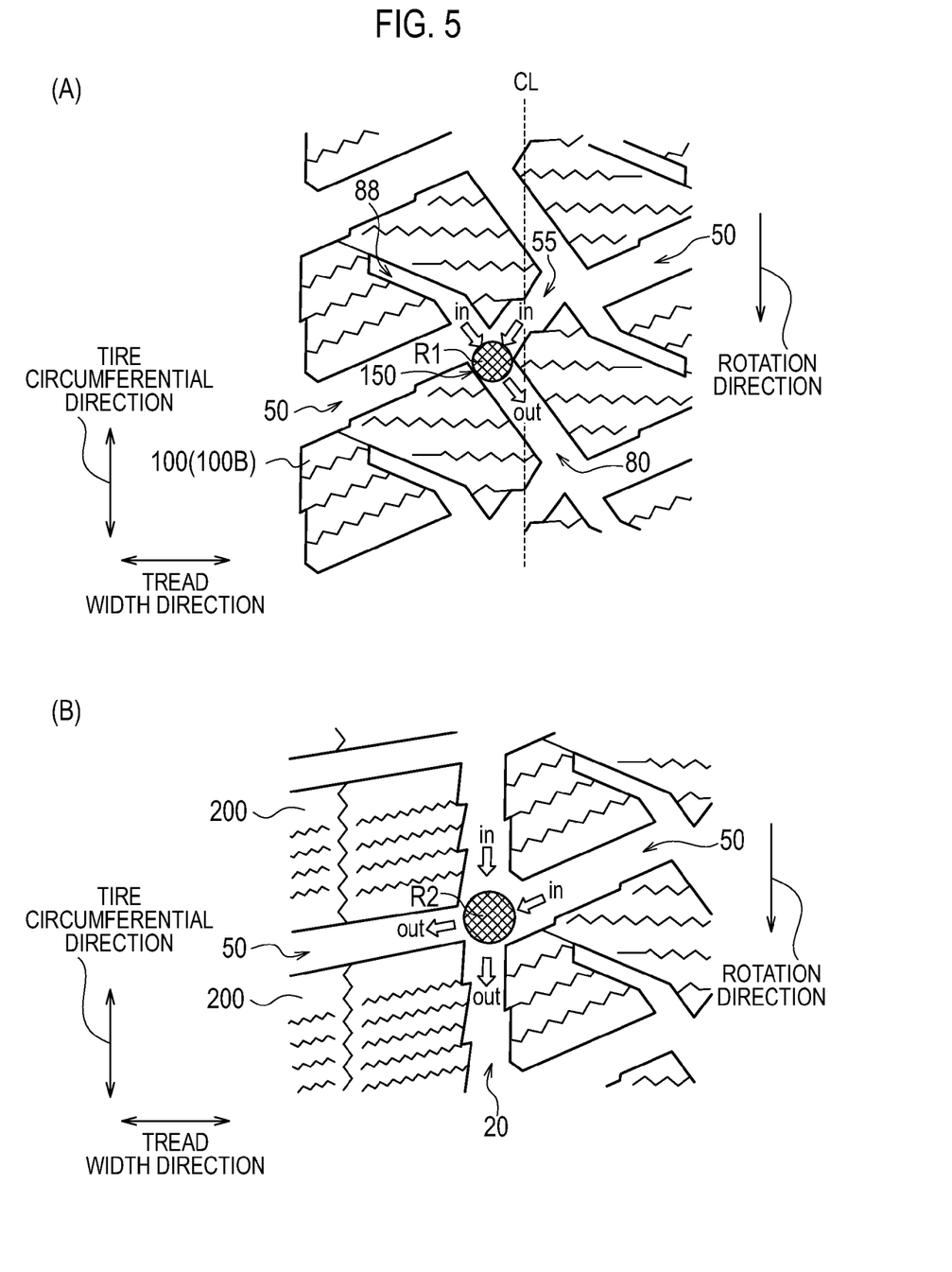
FIG. 5(a) is an enlarged schematic view showing a part of the tread pattern of the tire according to the present embodiment.
FIG. 5(b) is an enlarged schematic view showing a part of the tread pattern of the tire according to the present embodiment.

In the tire according to the present embodiment, the lug groove 50 includes the inner lug groove portion 55, and the inner lug groove portion 55 is adjacent to the block 100 while interposing the intersectional groove 80 in one of the extension directions of the inner lug groove portion 55 that is distanced from the tire equator line. As shown in FIG. 5(a), the intersectional groove 80 intersects with the lug groove 50. Therefore, the tire according to the present embodiment includes an intersectional region R1 that is a region where the lug groove 50 and the intersectional groove 80 intersect with each other. By the rotation of the tire, snow enters the intersectional groove 80 at the extension direction end 88 side. The entered snow is pushed out by a load towards the center of the intersectional groove 80. Furthermore, a grounding length that is a circumferential length of the tread surface 101a in the tire circumferential direction becomes shorter as the grounding length is distanced from the tire equator line. Thus, when the tread surface 101a comes into contact with the ground, the part, closer to the tire equator line, of the tread surface 101a comes into contact with the road surface earlier, and the part, farther away from the tire equator line, of the tread surface 101a comes into contact with the road surface later. Accordingly, snow enters the inner lug groove portion 55 first. Then, the entered snow is pushed out by a load in one of the extension directions that is distanced from the tire equator line. The inner lug groove portion 55 is adjacent to the block 100 while interposing the intersectional groove 80 in the extension directions, and thus, the block 100 dams up the pushed out snow. The snow pushed out in the intersectional groove 80 hits the snow pushed out from the inner lug groove portion 55 and dammed up by the block 100 in the intersectional region R1, thereby a strong snow column with high density is formed in the intersectional region R1. Accordingly, a large snow shearing force can be obtained, and thus, the snow traction performance is improved. It is possible to prevent the formed snow column from remaining in the intersectional region R1 because the snow column is discharged along the extension direction of the intersectional groove 80, and thus, it is possible to suppress the deterioration of the snow traction performance.

In addition, as shown in FIG. 5(b), the circumferential groove 20 intersects with the lug groove 50, and thus, the tire according to the present embodiment includes an intersectional region R2 that is a region where the circumferential groove 20 and lug groove 50 intersect with each other. Snow having entered the circumferential groove 20 is pushed out in the rotation direction by the rotation of the tire. Furthermore, as described above, the snow having entered the lug groove 50 is pushed out by the load in one of the extension directions, of the lug groove 50, that is distanced from the tire equator line. Accordingly, the snow pushed out in the circumferential groove 20 hits the snow pushed out in the lug groove 50 in the intersectional region R2, thereby a strong snow column with high density is formed in the intersectional region R2. Accordingly, a large snow shearing force can be obtained, and thus, the snow traction performance is improved. Further, the lug groove 50 extends to the end region TR, and thus, the snow column formed in the intersectional region R2 is discharged along the extension directions of the circumferential groove 20 and the lug groove 50. Thus, it is possible to prevent the snow column from remaining in the intersectional region R2, and thus, it is possible to suppress the deterioration of the snow traction performance.

(4) Comparative Evaluations

In order to investigate an effect of the present invention, the following comparative evaluations were performed. Further, the present invention is not limited to the following Examples.

The comparative evaluations used tires including blocks having characteristics shown in Table 1 under the following condition.

Tire size: 235/65R16C 115R
Tire pattern: LR50CZ
Inner Pressure: 475 kPa
Rim Size: 7J×16

Specifically, a tire according to Comparative Example 1 includes a block without a step portion formed therein. Tires according to Example 1 to Example 3 include blocks with step portions formed therein, each step portion including a first step surface and a second step surface. In the tire according to the Example 1, the length D1 and the length D2 have the same length. In the tire according to the Example 2, the length L1 and the length L2 have the same length. That is, in the tire according to the Example 2, a first direction length of the first step surface and a first direction length of the second step surface have the same length. In the tire according to the Example 3, the first direction length of the second step surface is longer than the first direction length of the first step surface. In addition, in the tires according to the Example 1 to the Example 3, each step portion is formed at the outer side in a tread width direction of a tire circumferential end.

By using aforementioned respective tires, snow traction performance and snow traction performance after wear were evaluated. The measurement of the snow traction performance and the snow traction performance after wear were performed according to the ASTM standard. The snow traction performance after wear was measured by using respective tires applied on a vehicle that had traveled 10000 km on a dry road. The results are shown in Table 1. In addition, the tire according to the Example 3 is used as a reference (100), and measured results of the respective tires were indexed. It is shown that any performance is more excellent as the value of the index is larger.

TABLE 1

|  | Com. Ex. 1 | Ex. 1 | Ex. 2 | Ex. 3 |
| --- | --- | --- | --- | --- |
| whether step portion exists | x | ○ | ○ | ○ |
| length D1 (%) | — | 20 | 20 | 20 |
| length D2 (%) | — | 20 | 45 | 45 |
| length L1 (mm) | — | 8 | 8 | 8 |
| length L2 (mm) | — | 24 | 8 | 24 |
| snow traction performance | 92 | 100 | 100 | 100 |
| snow traction performance after wear | 91 | 92 | 94 | 100 |

As shown in the Table 1, it can be seen that the snow traction performance is improved and at the same time, the snow traction performance due to the worn block is suppressed in the tire according to the Example 3 as compared to the Comparative Example 1. Specifically, it can be seen that the snow traction performance is improved by the step portion formed in the block. Furthermore, it can be seen that the snow traction performance after wear is improved by adjusting the first direction lengths and tire radial direction lengths of respective step surfaces.

(5) Other Embodiments

The contents of the present invention are disclosed through the above embodiments of the present invention. However, it should not be interpreted that the statements and drawings constituting a part of the present disclosure limit the present invention. The present invention includes various embodiments not described here.

For example, in the tire according to the present embodiment, the step portion 110 includes the step surface 110*a* configured only by the first step surface 111*a* and second step surface 121*a*. However, such a configuration is not limiting. The step portion 110 may include a third step surface lower by three steps from the tread surface 101*a* and that is a surface facing the outer side in the tread width direction. The step portion 110 may include at least four step surfaces.

Furthermore, in the tire according to the present embodiment, the first direction length of the second step surface 121*a* is longer than the first direction length of the first step surface 111*a*. However, such a configuration is not limiting. The first direction length of the first step surface and the first direction length of the second step surface may have the same length.

Furthermore, in the tire according to the present embodiment, the step portion 110 is formed only at the circumferential end 160. However, such a configuration is not limiting. The step portion 110 may be formed at the both circumferential ends, that is, the circumferential end 160 and circumferential end 170.

Furthermore, the tire according to the present embodiment includes the two block arrays of the block array including the blocks 100A and the block array including the blocks 100B. However, such a configuration is not limiting. The number of the block arrays may be one or at least three. When the number of the block arrays is one, the center of each block in the tread width direction slides towards one end side in the tread width direction, and a tread width direction end of the block at the one end side in the tread width direction is distanced from the tire equator line, more than a tread width direction end of the block at the other end side in the tread width direction.

Furthermore, in the tire according to the present embodiment, the block 100 and block 200 include a siping. However, such a configuration is not limiting. The block 100 and block 200 may not include a siping.

The tire according to the present invention may be a pneumatic tire with air or a so-called solid tire filled with rubber. Further, a pneumatic tire filled with rare gas such as argon rather than air may be used.

The technical range of the present invention is to be defined only by the inventive specific matter according to the adequate claims from all the above description.

In addition, the entire content of Japanese Patent Application No. 2011-140437 (filed on Jun. 24, 2011) is incorporated in the present description by reference.

INDUSTRIAL APPLICABILITY

As described above, the tire according to the present invention is able to improve snow traction performance and suppress the deterioration of the snow traction performance due to worn blocks, and thus is available for a tire manufacturing field.

The invention claimed is:
1. A tire comprising:
a block partitioned by a groove portion that includes a circumferential groove positioned at an outer side in a tread width direction from a tire equator line and extending in a tire circumferential direction and a lug groove extending in the tread width direction, in a tread planar view, wherein
a tread width direction outer end of the block is adjacent to the circumferential groove,
the tread width direction outer end is distanced from the tire equator line more than a tread width direction inner end of the block,
the block includes a step portion formed at a tire circumferential end, in which a height of the block gradually reduces as it goes towards an outer side in the tire circumferential direction from the center of the block,
the step portion includes a step surface that is a surface facing an outer side in a tire radial direction, and that includes at least a first step surface facing the outer side in the tire radial direction and lower by one step from a tread surface and a second step surface facing the outer side in the tire radial direction and lower by two steps from the tread surface,
the step surface extends from the tread width direction outer end towards the tread width direction inner end,
when a first direction is defined as a direction extending from the tread width direction outer end towards the tread width direction inner end in the step surface, a first direction length of the second step surface is longer than a first direction length of the first step surface, when a first direction length of a side surface of the block is defined as a length L, the first direction length of the first step surface is defined as a length L1, and the first direction length of the second step surface is defined as a length L2, at the tire circumferential end including the step portion, and the length L1 and the length L2 satisfy $0.1L \leq L1 \leq 0.3L$, and $2L1 \leq L2$.

2. The tire according to claim 1, wherein when a tire radial direction length from the tread surface to the first step surface is defined as a length D1 and a tire radial direction length from the first step surface to the second step surface is defined as a length D2, the length D1 and the length D2 satisfy $D2 < D1$.

3. The tire according to claim 2, wherein when the height of the block is defined as a height H, the length D1 and the length D2 satisfy $0.1H \leq D2 < D1 \leq 0.3H$.

4. The tire according to claim 1, wherein when a first direction is defined as a direction extending from the tread width direction outer end towards the tread width direction inner end, and a second direction is defined as a direction perpendicular to the first direction and the tire radial direction, in the step surface, and when an average length of the block in the second direction is defined as a width W, a length of the first step surface in the second direction is defined as a width W1, and a length of the second step surface in the second direction is defined as a width W2, the width W1 and the width W2 satisfy $0.02W \leq W1 \leq 0.05W$ and $0.02W \leq W2 \leq 0.05W$.

5. The tire according to claim 1, wherein the groove portion includes an intersectional groove extending to intersect with the lug groove, the intersectional groove communicates to the block, and an extension direction end of the intersectional groove is positioned in the block in the tread planar view.

6. The tire according to claim 5, wherein the block includes one tire circumferential end and the other tire circumferential end, the block includes the step portion formed only at the one tire circumferential end, and an opening is formed by the intersectional groove at the other tire circumferential end.

7. The tire according to claim 5, wherein the lug groove includes an inner lug groove portion positioned at an inner side in the tread width direction from the intersectional groove, and the inner lug groove portion is adjacent to the block in a direction away from the tire equator line among the extension directions of the inner lug groove portion, the intersectional groove being interposed between the inner lug groove portion and the block.

* * * * *